US011272506B2

(12) United States Patent
Lee et al.

(10) Patent No.: US 11,272,506 B2
(45) Date of Patent: Mar. 8, 2022

(54) MULTI-SIM DEVICE AND OPERATION METHOD THEREOF

(71) Applicant: SAMSUNG ELECTRONICS CO., LTD., Suwon-si (KR)

(72) Inventors: Jun-kyoung Lee, Yongin-si (KR); Chul-kyung Kim, Seoul (KR); Jong-wook Nam, Suwon-si (KR); Young-yong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/514,418

(22) Filed: Jul. 17, 2019

(65) Prior Publication Data
US 2020/0137755 A1 Apr. 30, 2020

(30) Foreign Application Priority Data

Oct. 24, 2018 (KR) .................. 10-2018-0127689

(51) Int. Cl.
H04W 72/04 (2009.01)
H04W 76/15 (2018.01)
H04W 88/06 (2009.01)
H04W 8/18 (2009.01)

(52) U.S. Cl.
CPC ....... *H04W 72/0453* (2013.01); *H04W 8/183* (2013.01); *H04W 76/15* (2018.02); *H04W 88/06* (2013.01)

(58) Field of Classification Search
CPC .............................. H04W 24/02; H04W 36/14
See application file for complete search history.

(56) References Cited

U.S. PATENT DOCUMENTS

| 9,131,475 | B2 | 9/2015 | Gude et al. |
| 9,319,977 | B2 | 4/2016 | Nayak et al. |
| 9,338,713 | B2 | 5/2016 | Chakravarthy et al. |
| 9,544,042 | B2 | 1/2017 | Li et al. |
| 9,674,696 | B2 | 6/2017 | Bai et al. |
| 9,705,555 | B2 | 7/2017 | Ezekiel et al. |
| 10,021,544 | B2 | 7/2018 | Shi et al. |
| 2015/0163827 | A1 | 6/2015 | Ekici |

(Continued)

FOREIGN PATENT DOCUMENTS

| EP | 3 322 235 A1 | 5/2018 |
| JP | 2003-189361 A | 7/2003 |

OTHER PUBLICATIONS

Communication dated Feb. 17, 2020 issued by the European Patent Office in counterpart European Application No. 19190012.5.

*Primary Examiner* — Joshua L Schwartz
(74) *Attorney, Agent, or Firm* — Sughrue Mion, PLLC

(57) ABSTRACT

A multi-subscriber identification module (SIM) device includes: a first SIM configured to use a service of a first network; a second SIM configured to use a service of a second network; a first RF resource configured to support use of non-limited channel configuration according to a radio resource control (RRC) protocol; a second RF resource configured to support use of limited channel configuration according to the RRC protocol; and a baseband processor configured to selectively assign any one of the first RF resource and the second RF resource to the first SIM and the second SIM, based on information regarding the first network and the second network.

10 Claims, 15 Drawing Sheets

(56) References Cited

U.S. PATENT DOCUMENTS

2016/0360456 A1* 12/2016 Vashi ................... H04W 36/14
2017/0280507 A1   9/2017 Wang
2017/0295513 A1  10/2017 Lee et al.
2018/0184309 A1   6/2018 Bhardwaj et al.
2018/0249349 A1*  8/2018 Hu ....................... H04W 76/28

* cited by examiner

FIG. 7

| NO. | MAIN SIM | SUB-SIM |
|---|---|---|
| case 1 | DCH | PCH |
| case 2 | DCH | PCH + BCH |
| case 3 | PCH | PCH |
| case 4 | PCH + BCH | PCH |
| case 5 | PCH | PCH + BCH |
| case 6 | PCH + BCH | PCH + BCH |

MULTI-SIM DEVICE AND OPERATION METHOD THEREOF

CROSS-REFERENCE TO RELATED APPLICATION

This application claims priority from Korean Patent Application No. 10-2018-0127689, filed on Oct. 24, 2018, in the Korean Intellectual Property Office, the disclosure of which is incorporated by reference herein in its entirety.

BACKGROUND

1. Field

The present disclosure relates to a multi-subscriber identity module (SIM) device including radio frequency (RF) resources assigned to SIMs and managing the assignment of the RF resources, and a method of operating the multi-SIM device.

2. Description of Related Art

Multi-SIM devices such as mobile phones, personal digital assistants (PDAs), tablet computers, and laptops may include at least two SIM cards. Each SIM card may include a unique international mobile subscriber identity (IMSI) and key information that allows a user of the multi-SIM device to be identified and authenticated by a service provider. The multi-SIM devices may enable users to access various networks by using the SIMs.

When a multi-SIM device is a dual SIM dual standby (DSDS) device, multiple SIMs share one RF resource, and thus, when request intervals for RF resource use of the SIMs overlap each other, the communication performance of the multi-SIM device deteriorates due to the SIMs to which RF resources are not assigned. Also, when the multi-SIM device is a dual SIM dual active (DSDA) device, plural RF resources are provided and are respectively assigned to the SIMs, and thus, the communication performance of the DSDA multi-SIM device is better when the multi-SIM device is a DSDS device. However, hardware and software specifications are great, and thus, manufacturing costs of the DSDA multi-SIM device and an amount of power consumed by the DSDA multi-SIM device greatly increase.

SUMMARY

It is an aspect to provide a multi-subscriber identity module (SIM) device including RF resources, which are used to provide better communication performance than a dual SIM dual standby (DSDS) device and reduce costs and power consumption compared to a dual SIM dual active (DSDA) device, and which more effectively assign the RF resources to SIMs, and a method of operating the multi-SIM device.

According to an aspect of an embodiment, there is provided a multi-SIM device including a first SIM configured to use a first service of a first network; a second SIM configured to use a second service of a second network; a first radio frequency (RF) resource configured to support use of a non-limited channel configuration according to a radio resource control (RRC) protocol; a second RF resource configured to support use of a limited channel configuration according to the RRC protocol; and a baseband processor configured to selectively assign the first RF resource and the second RF resource to the first SIM and the second SIM, based on information regarding the first network and the second network.

According to another aspect of an embodiment, there is provided a multi-SIM device including a plurality of SIMs; a plurality of radio frequency (RF) resources assigned to the plurality of SIMs, a first portion of the plurality of RF resources supporting use of a non-limited channel configuration and a second portion of the plurality of RF resources supporting use of a limited channel configuration according to a radio resource control (RRC) protocol; and a baseband processor configured to, in response to RF resource use request intervals of at least two target SIMs among the plurality of SIMs overlapping each other, control the plurality of RF resources to support the use of the non-limited channel configuration for one of the at least two target SIMs and to support the use of the limited channel configuration for the other of the at least two target SIMs, based on information regarding networks respectively corresponding to the at least two target SIMs.

According to another aspect of an embodiment, there is provided a method of operating a multi-SIM device including a first SIM and a second SIM, the method including generating, by using the first SIM, a radio frequency (RF) resource request; determining whether it is possible to set a dual radio (DR) mode in which use of a non-limited channel configuration and use of a limited channel configuration are simultaneously supported, based on first information regarding a first network corresponding to the first SIM and second information regarding a second network corresponding to the second SIM; and selectively assigning a first RF resource supporting the use of the non-limited channel configuration and a second RF resource supporting the use of the limited channel configuration to the first SIM and the second SIM, based on a result of the determining.

According to another aspect of an embodiment, there is provided a multi-subscriber identification module (SIM) device comprising a first radio frequency (RF) resource configured to support use of a non-limited channel configuration according to a radio resource control (RRC) protocol; a second RF resource configured to support use of a limited channel configuration according to the RRC protocol; and a baseband processor configured to communicate with a first network and a second network based on information stored in a first SIM and a second SIM using the first RF resource and the second RF resource, wherein the baseband processor operates the multi-SIM device in a dual SIM dual standby (DSDS) mode, except in response to a first RF resource use interval of the first SIM overlapping with a second RF resource use interval of the second SIM.

BRIEF DESCRIPTION OF THE DRAWINGS

Embodiments will be more clearly understood from the following detailed description taken in conjunction with the accompanying drawings in which:

FIG. 7 is a table for explaining a method of setting a main SIM and a sub-SIM, according to an embodiment;

DETAILED DESCRIPTION

A base station communicates with a terminal and assigns communication network resources to the terminal. The base station may be at least one of a cell, a base station (BS), a NodeB (NB), an eNodeB (eNB), a next generation radio access network (NG RAN), a wireless connection unit, a base station controller, and a node on a network.

A multi-subscriber identity module (SIM) device communicates with a base station or other multi-SIM devices and may be referred to as a node, user equipment (UE), next generation UE (NG UE), a mobile station (MS), mobile Equipment (ME), a device, a terminal, or the like.

The multi-SIM device may include at least one of a smart phone, a tablet personal computer (PC), a mobile phone, a video phone, an e-book reader, a desktop computer, a laptop, a netbook computer, a personal digital assistant (PDA), a portable multimedia player (PMP), an MP3 player, medical equipment, a camera, and a wearable device. In addition, the multi-SIM device may include at least one of a television (TV), a digital video disk (DVD) player, an audio system, a refrigerator, an air conditioner, a vacuum cleaner, an oven, a microwave, a washing machine, an air purifier, a set-top box, a home automation control panel, a security control panel, a media box (e.g., Samsung HomeSync™, Apple TV™, Google TV™, etc.), a game console (e.g., Xbox™, PlayStation™, etc.), an electronic dictionary, an electronic key, a camcorder, and an electronic frame. Furthermore, the multi-SIM device may include at least one of various medical devices (e.g., various portable medical measuring devices (a blood sugar measuring device, a heartbeat measuring device, a blood pressure measuring device, a temperature measuring device, and the like), magnetic resonance angiography (MRA), magnetic resonance imaging (MRI), computed tomography (CT), a camera, an ultrasonic device, etc.), a navigation device, a global navigation satellite system (GNSS), an event data recorder (EDR), a flight data recorder (FDR), an in-car infotainment device, a marine electronic device (e.g., a marine GPS system, a gyrocompass, etc.), avionics, a security device, a vehicle head unit, an industrial or domestic robot, a drone, an automated teller machine (ATM) of a financial institution, a point of sales (POS) of a shop, and an Internet of Things (IoT) device (e.g., a bulb, various sensors, a sprinkler, a fire alarm, a temperature controller, a street lamp, a toaster, sports equipment, a hot water tank, a heater, a boiler, etc.). The multi-SIM device may include various types of multimedia systems capable of performing communication functions.

Hereinafter, one or more embodiments will be described in detail with reference to the attached drawings.

Figure 1:
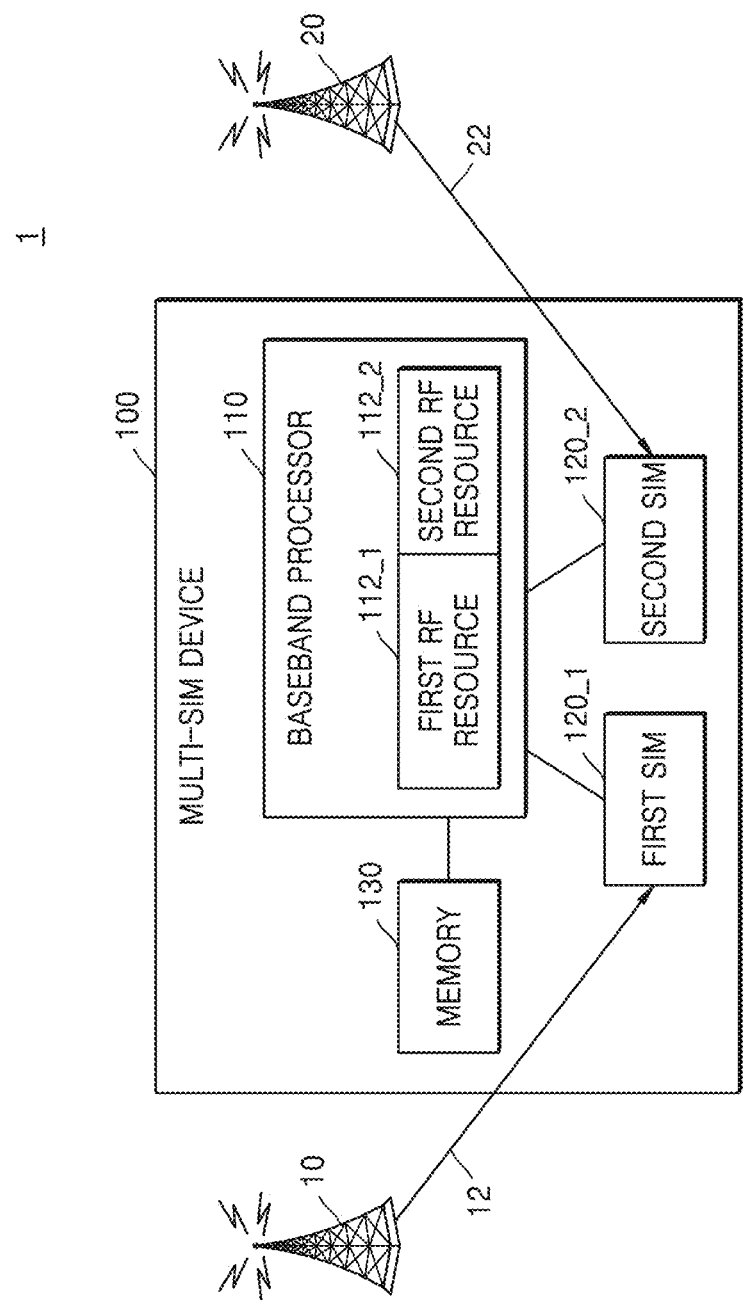
FIG. 1 is a block diagram of a wireless communication system including a multi-subscriber identity module (SIM) device and base stations, according to an embodiment.

FIG. 1 is a block diagram of a wireless communication system. The wireless communication system 1 includes a multi-SIM device 100 and a first base station 10 and a second base station 20, according to an embodiment. As a non-limiting example, the wireless communication system 1 may be a 5$^{th}$ generation (5G) wireless system, a Long Term Evolution (LTE) system, a Code Division Multiple Access (CDMA) system, a Wideband Code Division Multiple Access (WCDMA) system, a Global System for Mobile Communications (GSM) system, a Wireless Local Area Network (WLAN) system, or other arbitrary wireless communication systems. The multi-SIM device 100 may be connected to certain wireless communication networks through the first base station 10 and the second base station 20, and information may be transmitted from the wireless communication networks in multiple access manners such as Code Division Multiple Access (CDMA), Wideband Code Division Multiple Access (WCDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA. In this case, the multi-SIM device 100 and the first base station 10 and the second base station 20 may communicate with each other and may receive/transmit signals (or data) through various channels. In the present specification, reception/transmission of signals (or data) through channels may be described as reception/transmission of channels. Also, for convenience, communication between a baseband processor 110 and the first base station 10 and the second base station 20 by using a first SIM 120_1 and a second SIM 120_2 may be described as communication between the first and second SIMs 120_1 and 120_2 and the first base station 10 and the second base station 20. In other words, when such description is used, it will be understood that the baseband processor 110 is communicating with the first base station 10 and the second base station 20.

Referring to FIG. 1, the multi-SIM device 100 may include the baseband processor 110, the first SIM 120_1, the second SIM 120_2, and a memory 130. The first SIM 120_1 is to use a first network service and may be connected to a first network through the first base station 10. The second SIM 120_2 is to use a second network service and may be connected to a second network through the second base station 20.

The baseband processor 110 may include a first radio frequency (RF) resource 112_1 and a second RF resource 112_2. The first and second RF resources 112_1 and 112_2 may include tangible or intangible resources used to process circuits and paths for receiving channels from the first base station 10 and the second base station 20 or transmission/reception channels. Hereinafter, a case where the first and second RF resources 112_1 and 112_2 are used to receive channels will be mainly described, but this is merely an example. The embodiments are not limited thereto, and it will be understood that the first and second RF resources 112_1 and 112_2 may be used to transmit channels.

In an embodiment, the first RF resource 112_1 may support the use of a non-limited channel configuration according to a Radio Resource Control (RRC) protocol, and the second RF resource 112_2 may support the use of a limited channel configuration according to the RRC protocol. In detail, the first RF resource 112_1 may support processing channels that a certain SIM handles to maintain a network connection mode and channels handled in an idle mode. The second RF resource 112_2 may only support processing channels that a certain SIM handles in the idle mode. Also, the channels that the SIM handles in the idle mode may have a periodic characteristic and may include scheduling information notifying transmission timings of the channels. For example, when the wireless communication system 1 is a WCDMA system, channels that the SIM handles to maintain the network connection mode may be a Dedicated Channel (DCH), a Forward Access Channel (FACH), a Random Access Channel (RACH), a Broadcast Channel (BCH), a Paging Channel (PCH), and the like. The channels that the SIM handles in the idle mode may be defined as the BCH and the PCH. Furthermore, when the wireless communication system 1 is the LTE system, the channels that the SIM handles to maintain the network connection mode may be a Downlink Shared Channel (DL-SCH), a Multicast Channel (MCH), a BCH, a PCH, and the like, and the channels that the SIM handles in the idle mode may be a Multicast Channel (MCH), a BCH, and a PCH.

As described, since the first RF resource 112_1 has to support processing more types of channels than the second RF resource 112_2, a structure of the first RF resource 112_1 may differ from that of the second RF resource 112_2. In detail, the complexity of the structure of the first RF resource 112_1 may be greater than the complexity of the second RF resource 112_2.

The first SIM 120_1 may receive at least one first channel 12 to use the first network service, and the second SIM 120_2 may receive at least one second channel 22 to use a second network service. In this case, the first SIM 120_1 and the second SIM 120_2 use RF resources to process the first channel 12 and the second channel 22, and in this case, the baseband processor 110 may selectively assign any one of the first RF resource 112_1 and the second RF resource 112_2 to the first SIM 120_1 and the second SIM 120_2, based on information regarding the first network and the second network.

In an embodiment, the multi-SIM device 100 may operate in a dual radio (DR) mode or a dual SIM dual standby (DSDS) mode during the resource assignment. The DR mode denotes an operation mode in which the first RF resource 112_1 and the second RF resource 112_2 may be respectively assigned to the first and second SIMs 120_1 and 120_2 and a communication operation is performed by using the first and second RF resources 112_1 and 112_2. The baseband processor 110 may make a determination as to whether the multi-SIM device 100 operates in the DR mode, based on the information regarding the first network and the second network.

When it is determined that the multi-SIM device 100 is operable in the DR mode, the baseband processor 110 may set any one of the first SIM 120_1 and the second SIM 120_2 as a main SIM and the other thereof as a sub-SIM and then may assign the main SIM to the first RF resource 112_1 and the sub-SIM to the second RF resource 112_2. A method in which the baseband processor 110 sets the main SIM and the sub-SIM will be described with reference to FIGS. 7 to 8B. For example, when the first SIM 120_1 is set as the main SIM and the second SIM 120_2 is set as the sub-SIM, the first SIM 120_1 may perform an operation in a connection mode with the first network or in the idle mode by processing the first channel 12 received from the first base station 10 by using the first RF resource 112_1. The second SIM 120_2 may perform an operation in the idle mode by processing the second channel 22 received from the second base station 20 by using the second RF resource 112_2. The operation in the connection mode may include operation of actively exchanging data (e.g., voice or data calls or sessions) with at least one base station in the wireless communication system 1, and the operation in the idle mode may include an operation of monitoring a channel (e.g., a PCH or a BCH) having periodic characteristics. In some embodiments, the operation in the idle mode may include only an operation of monitoring the channel having periodic characteristics.

The multi-SIM device 100 according to an embodiment may operate in the DR mode when RF resource use request intervals of the first and second SIMs 120_1 and 120_2 overlap each other and may respectively assign the first RF resource 112_1 and the second RF resource 112_2 to the first and second SIMs 120_1 and 120_2, thereby performing a communication operation by using the first and second SIMs 120_1 and 120_2. In this case, the second RF resource 112_2 that has low manufacturing costs and power consumption is utilized in the DR mode, and thus, the communication performance equal to greater than a threshold level may be secured.

When it is determined that the multi-SIM device 100 is not operable in the DR mode, the baseband processor 110 may assign the first RF resource 112_1 to any one of the first SIM 120_1 and the second SIM 120_2 and may control a selected one of the first SIM 120_1 and the second SIM 120_2 to operate in the DSDS mode. Furthermore, the multi-SIM device 100 may operate in the DSDS as a legacy mode, and under certain conditions to be described below in detail, the multi-SIM device 100 may operate in the DR mode.

The information regarding the first network and the second network, which is used to determine whether the multi-SIM device 100 is operable in the DR mode and set the main SIM and the sub-SIM, may include information regarding at least one first channel 12 between the first network and the first SIM 120_1 and information regarding at least one second channel 22 between the second network and the second SIM 120_2. That is, the information regarding the first channel 12 may include first channel configuration information indicating a type of the first channel 12, and when the first channel 12 is a channel having periodic characteristics, the information regarding the first channel 12 may include first scheduling information regarding the first channel 12. Also, the information regarding the second channel 22 may include second channel configuration information indicating a type of the second channel 22, and when the second channel 22 is a channel having periodic characteristics, the information regarding the second channel 22 may include second scheduling information regarding the second channel 22.

The memory 130 may store the information regarding the first network and the information regarding the second network, and whenever the information regarding the first network and the information regarding the second network are updated, the memory 130 may store the updated information regarding the first network and the second network. The baseband processor 110 may access the memory 130 and read the information regarding the first network and the information regarding the second network, thus performing operations according to one or more embodiments.

FIG. 1 shows that the multi-SIM device 100 includes two SIMs, that is, the first and second SIMs 120_1 and 120_2, and the baseband processor 110 includes two RF resources, that is, the first and second RF resources 112_1 and 112_2. However, the multi-SIM device 100 may include more SIMs and more RF resources. It will be understood that one or more embodiments below may be applied to a multi-SIM device including three or more SIMs and/or three or more RF resources.

Figure 2:
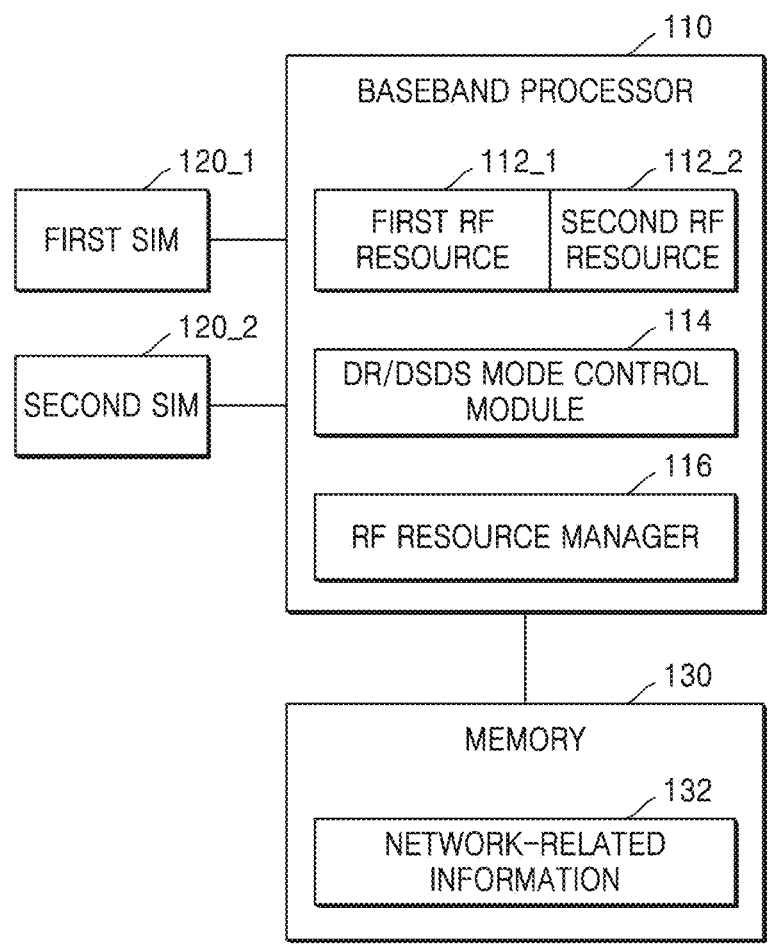
FIG. 2 is a block diagram showing in detail a baseband processor and a memory of the wireless communication system of FIG. 1, according to an embodiment.

FIG. 2 is a block diagram showing in detail the baseband processor 110 according to an embodiment.

Referring to FIG. 2, the baseband processor 110 may include the first RF resource 112_1, the second RF resource 112_2, a DR/DSDS mode control module 114, and a RF resource manager 116. As described above, the first RF resource 112_1 may support the use of a non-limited channel configuration, and the second RF resource 112_2 may support the use of a limited channel configuration.

The DR/DSDS mode control module 114 may read network-related information 132 stored in the memory 130 and may determine whether the multi-SIM device is operable in the DR mode. The DR/DSDS mode control module 114 may control the multi-SIM device to operate in the DR mode or to operate in the DSDS mode or maintain the DSDS mode, according to a determination result. A detailed embodiment regarding a method of setting the DR mode and the DSDS mode will be described with reference to FIGS. 4 and 5.

When the multi-SIM device is operable in the DR mode, the RF resource manager 116 may set any one of the first SIM 120_1 and the second SIM 120_2 as a main SIM and assign the first RF resource 112_1 thereto and may set the other thereof as a sub-SIM and assign the second RF resource 112_2 thereto, based on the network-related information. A detailed embodiment regarding a method of assigning the first and second RF resources 112_1 and 112_2 to the first and second SIMs 120_1 and 120_2 in the DR mode will be described in detail with reference to FIGS. 7 and 8B.

The memory 130 may store therein the network-related information 132 including the information regarding the first network corresponding to the first SIM 120_1, and the information regarding the second network corresponding to the second SIM 120_2. The information regarding the first network may be generated based on at least one first channel that the first SIM 120_1 receives from the first network, and the information regarding the second network may be generated based on at least one second channel that the second SIM 120_2 receives from the second network.

Whenever the information regarding the first network of the first SIM 120_1 and the information regarding the second network of the second SIM 120_2 are updated, the network-related information 132 may be updated, and a detailed embodiment thereof will be described with reference to FIG. 3.

In an embodiment, the DR/DSDS mode control module 114 and the RF resource manager 116 may be realized as hardware logics in the baseband processor 110. In another embodiment, the DR/DSDS mode control module 114 and the RF resource manager 116 may be stored in the memory 130 as command codes and realized as software logics executed by the baseband processor 110. However, these embodiments are merely examples, and the inventive concept is not limited thereto. The first and second RF resources 112_1 and 112_2, the DR/DSDS mode control module 114, and the RF resource manager 116 may be realized as various types of logics.

Figure 3:
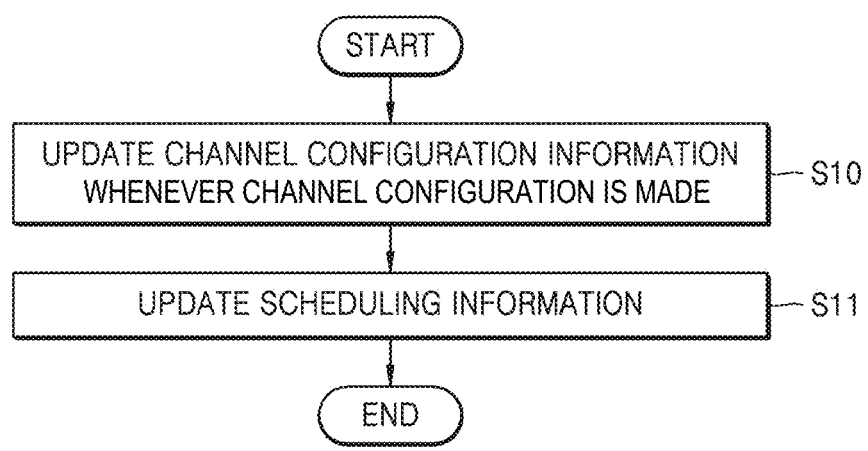
FIG. 3 is a flowchart for explaining a method of updating network-related information in the memory of FIG. 2, according to an embodiment.

FIG. 3 is a flowchart of a method of updating the network-related information 132 of FIG. 2, according to an embodiment. Hereinafter, the embodiment of FIG. 3 will be described with reference to FIG. 2 for understanding.

Referring to FIG. 3, in operation S10, whenever a channel configuration is made, channel configuration information may be updated. For example, whenever a channel configuration of one or more SIMs of the multi-SIM device is made, channel configuration information may be updated. Also, the multi-SIM device may store the updated channel configuration information in the memory of the multi-SIM device to later determine whether the multi-SIM device is operable in the DR mode and assign RF resources. A description that the channel configuration of an SIM is made may mean that channels received from a network corresponding to the SIM are changed or newly added. For example, channels received from the first network may be changed, and a new assignment of RF resources may be performed for the first SIM 120_1 to enable channel configuration of the changed channels, to process the changed channels. The first SIM 120_1 may update the channel configuration information and store the updated channel configuration information in the memory 130. As described above, the channel configuration information may indicate types of channels. For example, the updated channel configuration information may indicate types of new channels received from the network.

In operation S11, scheduling information may be updated. For example, in some embodiments, scheduling information regarding channels of each SIM of the multi-SIM device which have periodic characteristics may be updated. Also, the multi-SIM device may store the updated scheduling information in the memory of the multi-SIM device to later determine whether the multi-SIM device is operable in the DR mode and assign RF resources. For example, as an operation in the idle mode, a state of the SIM may be changed from a sleep state to a wake-up state in a certain interval, and the SIM may receive PCH (or a paging message) or a BCH and then be switched to be in the sleep state. Immediately before the SIM is switched to the sleep state, scheduling information regarding a certain interval in which the SIM has to be in the wake-up state to receive a next PCH or a BCH (e.g., information regarding a timing when the state of the SIM is changed to a next wake-up state or a timing when the wake-up state has to be maintained) may be updated.

Furthermore, the multi-SIM device may update frequency band information regarding channels received by each SIM and may update intensity information regarding a reference signal received by each SIM. The multi-SIM device may determine whether the DR mode is available based on the frequency band information, and a detailed embodiment thereof will be described with reference to FIGS. 5 and 6. Also, the multi-SIM device may perform base station (or a cell) reselection, a handover operation, and the like in the idle mode, based on reference signal intensity information. The embodiment is merely an example, and one or more embodiments are not limited thereto. The multi-SIM device may collect more types of information to effectively assign RF resources supporting the use of non-limited channel configuration and RF resources supporting the use of limited channel configuration respectively to SIMs, and may update the collected information.

Figure 4:
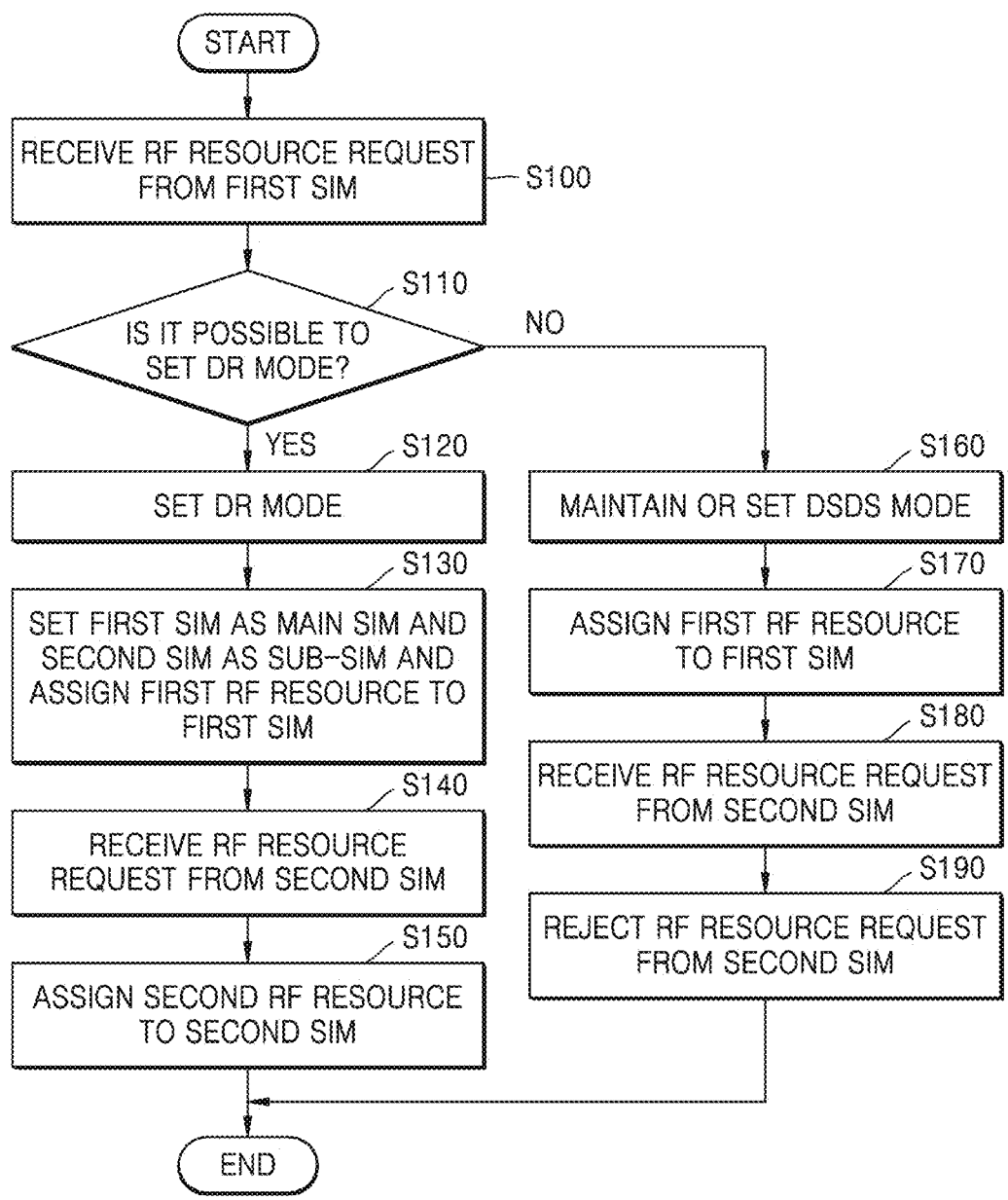
FIG. 4 is a flowchart for explaining a method of assigning a first RF resource and a second RF resource of the baseband processor of FIG. 2, according to an embodiment.

FIG. 4 is a flowchart for explaining a method of assigning the first RF resource 112_1 and the second RF resource 112_2 of FIG. 2, according to an embodiment. Hereinafter, the embodiment of FIG. 4 will be described with reference to FIG. 2.

Referring to FIGS. 2 and 4, in operation S100, the baseband processor 110 may receive a RF resource request from the first SIM 120_1. That is, the first SIM 120_1 may request RF resources to process a certain channel received from the first network. In operation S110, in response to the RF resource request, the DR/DSDS mode control module 114 may determine whether it is possible to set the DR mode, based on the network-related information 132. When it is possible to set the DR mode (operation S110, Yes), the DR/DSDS mode control module 114 may set the multi-SIM device to be in the DR mode in operation S120, and the RF resource manager 116 may set the first SIM 120_1 as the main SIM and the second SIM 120_2 as the sub-SIM based on the network-related information 132 and then may assign the first RF resource 112_1 to the first SIM 120_1 in operation S130. In operation S140, the baseband processor 110 may receive a RF resource request from the second SIM 120_2. That is, the second SIM 120_2 may request RF resources to process a certain channel received from the second network. The RF resource manager 116 may assign the second RF resource 112_2 to the second SIM 120_2 in response to the RF resource request from the second SIM 120_2.

When it is impossible to set the DR mode (operation S110, No), the DR/DSDS mode control module 114 may maintain or set the operation mode of the multi-SIM device to be the DSDS mode in operation S160 and may assign the first RF resource 112_1 to the first SIM 120_1 in operation S170. In operation S180, the baseband processor 110 may receive the RF resource request from the second SIM 120_2. Since the multi-SIM device currently operates in the DSDS mode and the first RF resource 112_1 is assigned to the first SIM 120_1, the RF resource manager 116 may reject the RF resource request from the second SIM 120_2 in operation S190.

Figure 5:
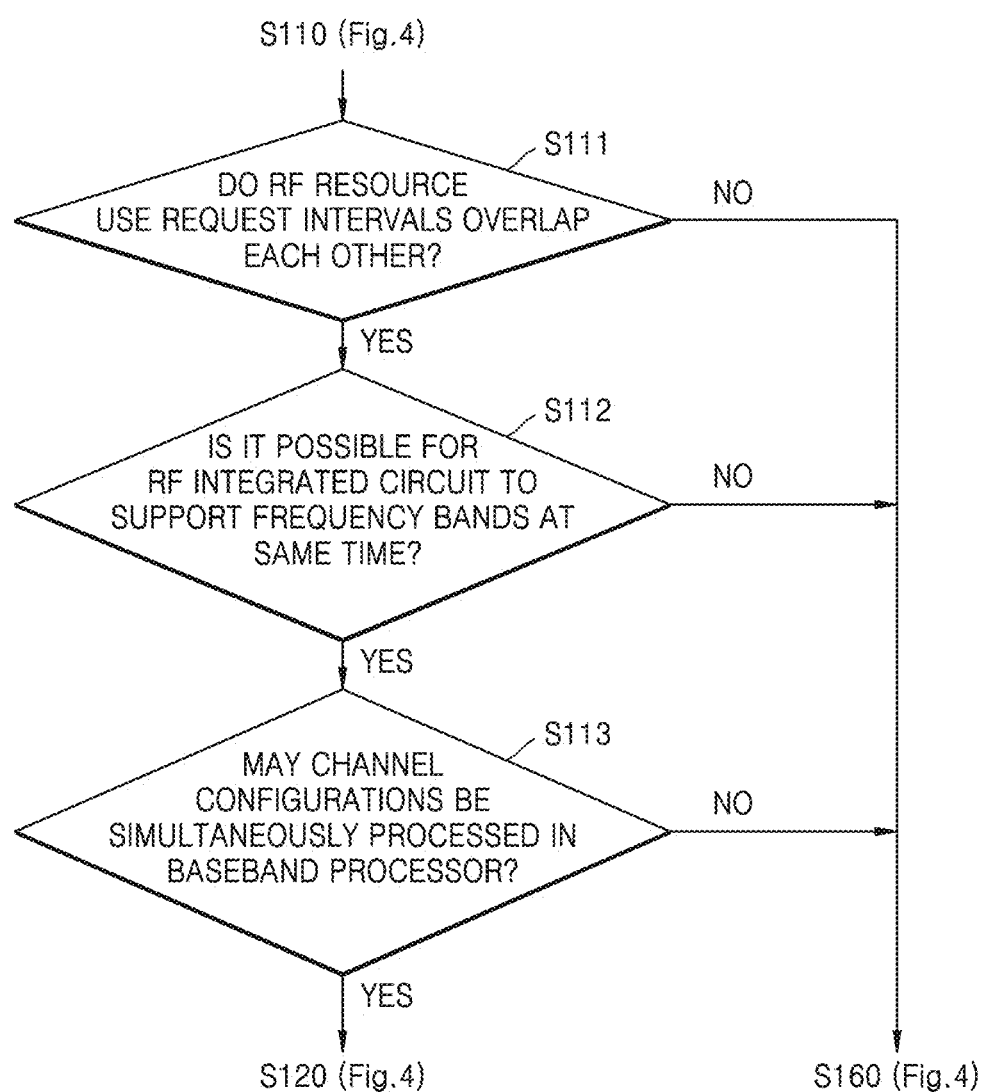
FIG. 5 is a flowchart showing in detail an operation S110 in the method of FIG. 4, according to an embodiment.

FIG. 5 is a flowchart showing in detail operation S110 of FIG. 4, according to an embodiment. Hereinafter, the embodiment of FIG. 5 will be described with reference to FIG. 2.

Referring to FIGS. 2 and 5, to perform operation S110 (FIG. 4), the DR/DSDS mode control module 114 may determine whether RF resource use request intervals of the first SIM 120_1 and the second SIM 120_2 overlap each other, in operation S111. The DR/DSDS mode control module 114 may determine whether the RF resource use request interval of the second SIM 120_2 overlaps the RF resource use request interval of the first SIM 120_1, based on network-related information 132 and information regarding the RF resource use request interval included in the RF resource request from the first SIM 120_1. In detail, when the channel received by the second SIM 120_2 is a channel having a periodic characteristic, the network-related information 132 may include scheduling information regarding the channel received by the second SIM 120_2, and the DR/DSDS mode control module 114 may identify in advance the RF resource use request interval of the second SIM 120_2, based on the scheduling information.

When the RF resource use request intervals overlap each other (operation S111, Yes), the DR/DSDS mode control module 114 may determine whether it is possible for a RF integrated circuit included in the multi-SIM device to support both a frequency band of the channel received by the first SIM 120_1 and a frequency band of the channel received by the second SIM 120_2 at the same time, in operation S112. That is, the RF integrated circuit included in the multi-SIM device may support a limited number of frequency bands, and accordingly, the multi-SIM device may determine whether the RF integrated circuit may cover the frequency band of the channel received by the first SIM 120_1 and the frequency band of the channel received by the second SIM 120_2. Information regarding frequency bands supportable by the RF integrated circuit may be stored in the memory 130 in advance, and the network-related information 132 may further include information regarding the frequency band of the channel received by the first SIM 120_1 and the frequency band of the channel received by the second SIM 120_2. The DR/DSDS mode control module 114 may perform operation S112 based on the information stored in the memory 130.

When the RF integrated circuit may simultaneously support the frequency bands (operation S112, Yes), the DR/DSDS mode control module 114 may determine whether the channel configurations may be simultaneously processed by using the first RF resource 112_1 and the second RF resource 112_2 of the baseband processor 110, in operation S113. When the first RF resource 112_1 and the second RF resource 112_2 are respectively assigned to the first SIM 120_1 and the second SIM 120_2, the DR/DSDS mode control module 114 may determine whether the channel received by the first SIM 120_1 and the channel received by the second SIM 120_2 may be processed. For example, when the channel received by the first SIM 120_1 is a DCH and the channel received by the second SIM 120_2 is a DCH, processing the DCH may be supported only by the first RF resource 112_1, and thus the channels received by the first SIM 120_1 and the second SIM 120_2 may not be simultaneously processed in the baseband processor 110. Also, when the channel received by the first SIM 120_1 is a DCH and the channel received by the second SIM 120_2 is a PCH or a BCH, processing the DCH may be supported by the first RF resource 112_1 and processing the PCH or the BCH may be supported by the second RF resource 112_2, and thus, the channels may be simultaneously processed in the baseband processor 110. The DR/DSDS mode control module 114 may perform operation S113 based on the channel configuration information regarding the first SIM 120_1 and the channel configuration information regarding the second SIM 120_2, both of which are included in the network-related information 132.

When the channel configurations may be simultaneously processed in the baseband processor 110 (operation S113, Yes), operation S120 (FIG. 4) may be performed, and when any one of operations S111 to S113 is No, operation S160 (FIG. 4) may be performed.

An order of performing operations S111 to S113 of FIG. 5 is merely an example, and one or more embodiments are not limited thereto. The order of performing operations S111 to S113 of FIG. 5 may vary. Some operations except operation S111 may be omitted, or other operations may be added.

Figure 6:
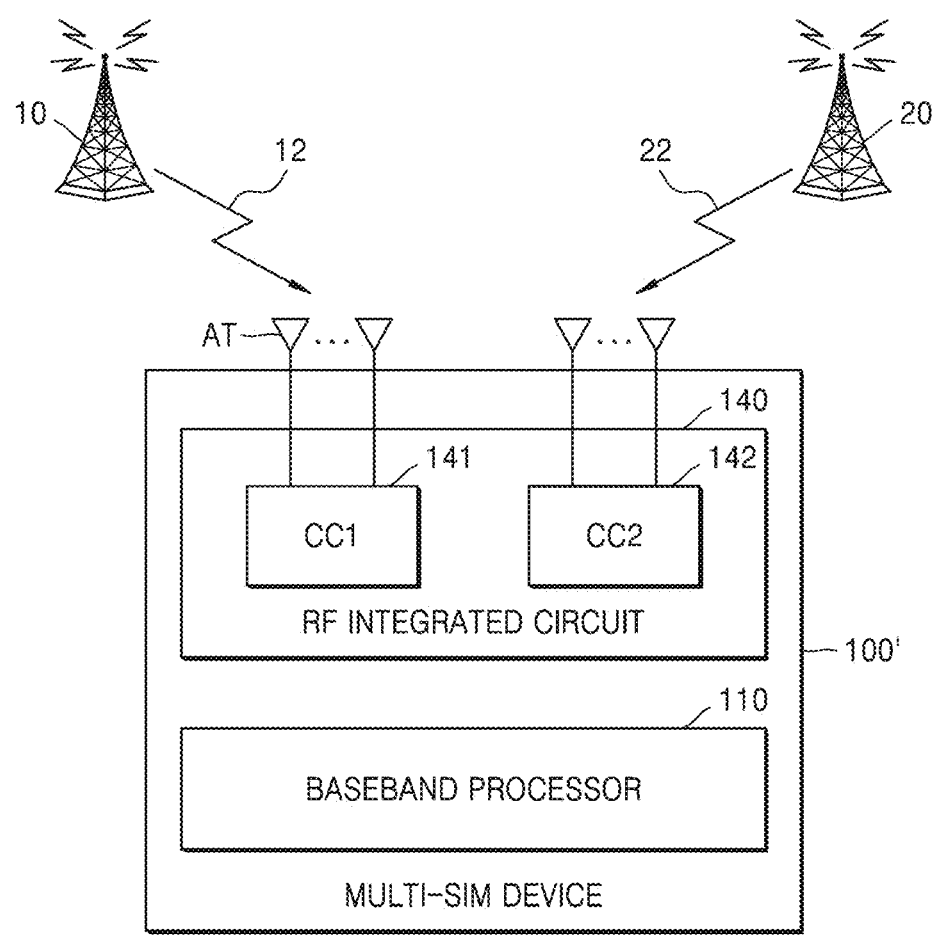
FIG. 6 is a block diagram showing a multi-SIM device for explaining an operation S112 of FIG. 5.

FIG. 6 is a block diagram showing a multi-SIM device 100' for explaining operation S112 of FIG. 5.

Referring to FIG. 6, the multi-SIM device 100' may further include a RF integrated circuit 140 in comparison with the multi-SIM device 100 of FIG. 1. A structure of the multi-SIM device 100' other than the RF integrated circuit 140 is the same as in FIG. 1 and is described with reference to FIG. 1, and thus the detailed descriptions thereof will be omitted for conciseness. The RF integrated circuit 140 may include a first carrier component (CC1) 141 and a second carrier component (CC2) 142. The first and second carrier components 141 and 142 may be connected to antennas AT (or antenna arrays) for supporting beam forming. Each of the first and second carrier components 141 and 142 may receive a channel having a certain frequency band. In an embodiment, a frequency band supported by the first carrier component 141 may be the same as or different from that supported by the second carrier component 142.

The baseband processor 110 may determine whether the first channel 12 may be received from the first base station 10 and the second channel 22 may be received from the second base station 20 through the first and second carrier components 141 and 142 of the RF integrated circuit 140. When it is possible to receive the first channel 12 and the second channel 22 through the first and second carrier components 141 and 142 of the RF integrated circuit 140, the baseband processor 110 may not perform operation S112 (FIG. 5). In other words, the baseband processor 110 may primarily determine whether it is possible to set the DR mode by using hardware characteristics of the RF integrated circuit 140, rather than information stored in memory as described above with reference to operation S112. The structure of the RF integrated circuit 140 of FIG. 6 is merely an example, and one or more embodiments are not limited thereto. The RF integrated circuit 140 may include more or fewer carrier components.

FIG. 7 is a table TB for explaining a method of setting a main SIM and a sub-SIM, according to an embodiment. Hereinafter, the embodiment of FIG. 7 will be described with reference to FIG. 2 and assuming that the multi-SIM device is included in a WCDMA system.

Referring to FIGS. 2 and 7, the RF resource manager 116 may set any one of the first SIM 120_1 and the second SIM 120_2 as a main SIM and the other thereof as a sub-SIM, based on channel configuration information regarding a channel between the first SIM 120_1 and the first network and channel configuration information regarding a channel between the second SIM 120_2 and the second network, both of which are included in the network-related information 132 of the memory 130.

Referring to the table TB, in a first case (case 1), when the channel between the first SIM 120_1 and the first network is a DCH and the channel between the second SIM 120_2 and the second network is a PCH, the RF resource manager 116 may set the first SIM 120_1 as the main SIM and the second SIM 120_2 as the sub-SIM. In a second case (case 2), when the channel between the first SIM 120_1 and the first network is a DCH and the channel between the second SIM 120_2 and the second network is a PCH or a BCH, the RF resource manager 116 may set the first SIM 120_1 as the main SIM and the second SIM 120_2 as the sub-SIM. That is, the RF resource manager 116 may set, as the main SIM, an SIM using a channel (e.g., a DCH) having a non-periodic characteristic and assign the first RF resource 112_1 thereto, and may set, as the sub-SIM, an SIM using a channel (e.g., a PCH, a BCH, etc.) having a periodic characteristic and assign the second RF resource 112_2 thereto.

Third to sixth cases (case 3 to case 6) indicate setting the main SIM and the sub-SIM when the channel between the first SIM 120_1 and the first network and the channel between the second SIM 120_2 and the second network have periodic characteristics. In the third to sixth cases (case 3 to case 6), the RF resource manager 116 may set any one of the first SIM 120_1 and the second SIM 120_2 as the main SIM and the other thereof as the sub-SIM based on scheduling information regarding channels which is included in the network-related information 132.

Figure 8A:
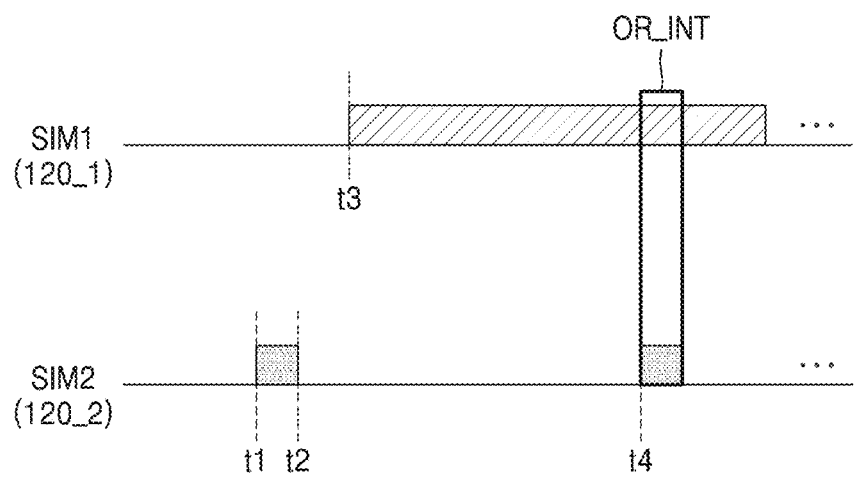
FIGS. 8A and 8B are diagrams for explaining in detail a method of setting a main SIM and a sub-SIM, according to an embodiment.
Figure 8B:
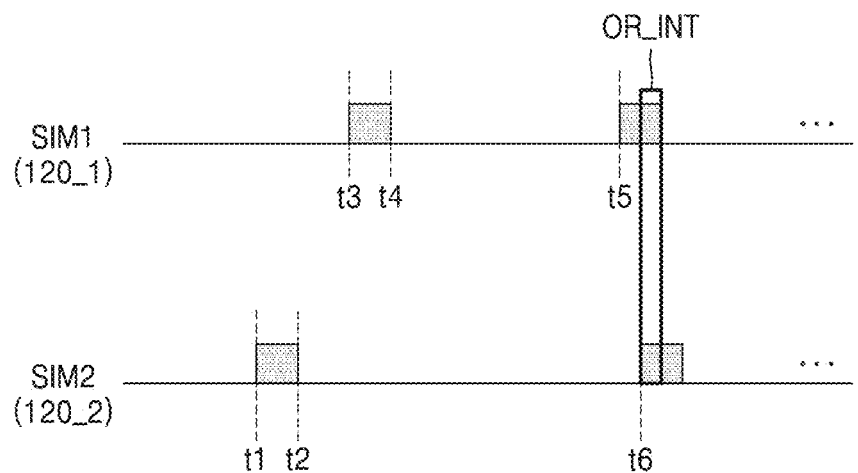

FIGS. 8A and 8B are diagrams for explaining in detail a method of setting a main SIM and a sub-SIM, according to an embodiment. Hereinafter, the embodiments of FIGS. 8A and 8B will be described with reference to FIG. 2.

Referring to FIG. 8A, the first SIM (SIM1) 120_1 may be in a connection mode, and the second SIM (SIM2) 120_2 may be in an idle mode. The second SIM 120_2 may receive a periodic channel periodic_CH in a wake-up state from a first point in time t1 to a second point in time t2. At the second point in time t2, a state of the second SIM 120_2 may be changed to a sleep state and at the same time, may update, in the memory 130, scheduling information regarding a periodic channel periodic_CH which includes information regarding a fourth point in time t4 of a wake-up state of a next second SIM 120_2 and information regarding a period during which the wake-up state is to be maintained. For example, when the periodic channel periodic_CH is a PCH, the scheduling information may include discontinuous reception (DRX) periodic information.

In the connection mode, the first SIM 120_1 is to receive a non-periodic channel Non_periodic_CH from a third point in time t3, and at this point in time, RF resource assignment may be performed for the first SIM 120_1. When a RF resource assignment request is received from the first SIM 120_1, the RF resource manager 116 may detect in advance an interval OR_INT, when the RF resource use request intervals of the first SIM 120_1 and the second SIM 120_2 overlap each other, based on the network-related information 132 of the memory 130, set the first SIM 120_1 as the main SIM at the third point in time t3, assign the first RF resource 112_1 thereto, and set the second SIM 120_2 as the sub-SIM. The first SIM 120_1 may process a non-periodic channel Non_periodic_CH from the third point in time t3, by using the first RF resource 112_1.

Then, when the state of the second SIM 120_2 is changed to the wake-up state at the fourth point in time t4, the RF manager 116 may assign the second RF resource 112_2 to the second SIM 120_2. The second SIM 120_2 may use the second RF resource 112_2 to process the periodic channel periodic_CH from the fourth point in time t4.

Referring to FIG. 8B, the first SIM 120_1 may be in the idle mode, and the second SIM 120_2 may also be in the idle mode. The second SIM 120_2 may receive the periodic channel periodic_CH in the wake-up state from the first point in time t1 to the second point in time t2. At the second point in time t2, the state of the second SIM 120_2 may be changed to the sleep state, and at the same time, scheduling information regarding the periodic channel periodic_CH, which includes information regarding a sixth point in time t6 of the wake-up state of a next second SIM 120_2 and information regarding a period during which the wake-up state is to be maintained, may be updated to the memory 130.

In the idle mode, the first SIM 120_1 may receive the periodic channel periodic_CH in the wake-up state from the third point in time t3 to the fourth point in time t4. At the fourth point in time t4, the state of the first SIM 120_1 may be changed to the sleep state, and at the same time, scheduling information, which includes information regarding the fifth point in time t5 of the wake-up state of a next first SIM 120_1 and information regarding a period when the wake-up state is to be maintained, may be updated to the memory 130.

The first SIM 120_1 may receive the periodic channel periodic_CH from the fifth point in time t5, and at this point in time, a RF resource may be assigned to the first SIM 120_1. When the RF resource assignment request is received from the first SIM 120_1, the RF resource manager 116 may use the network-related information 132 of the memory 130 and may detect in advance the interval OR_INT when the RF resource use request intervals of the first SIM 120_1 and the second SIM 120_2 overlap. The RF resource manager 116 may use the network-related information 132 to identify that a wake-up timing (the fifth point in time t5) of the first SIM 120_1 is earlier than a wake-up timing (the sixth point in time t6) of the second SIM 120_2, and accordingly, the RF resource manager 116 may set the first SIM 120_1 as the main SIM and the second SIM 120_2 as the sub-SIM.

The first SIM 120_1 may process the periodic channel periodic_CH from the fifth point in time t5 by using the first RF resource 112_1, and the second SIM 120_2 may process the periodic channel periodic_CH from the sixth point in time t6 by using the second RF resource 112_2.

Figure 9:
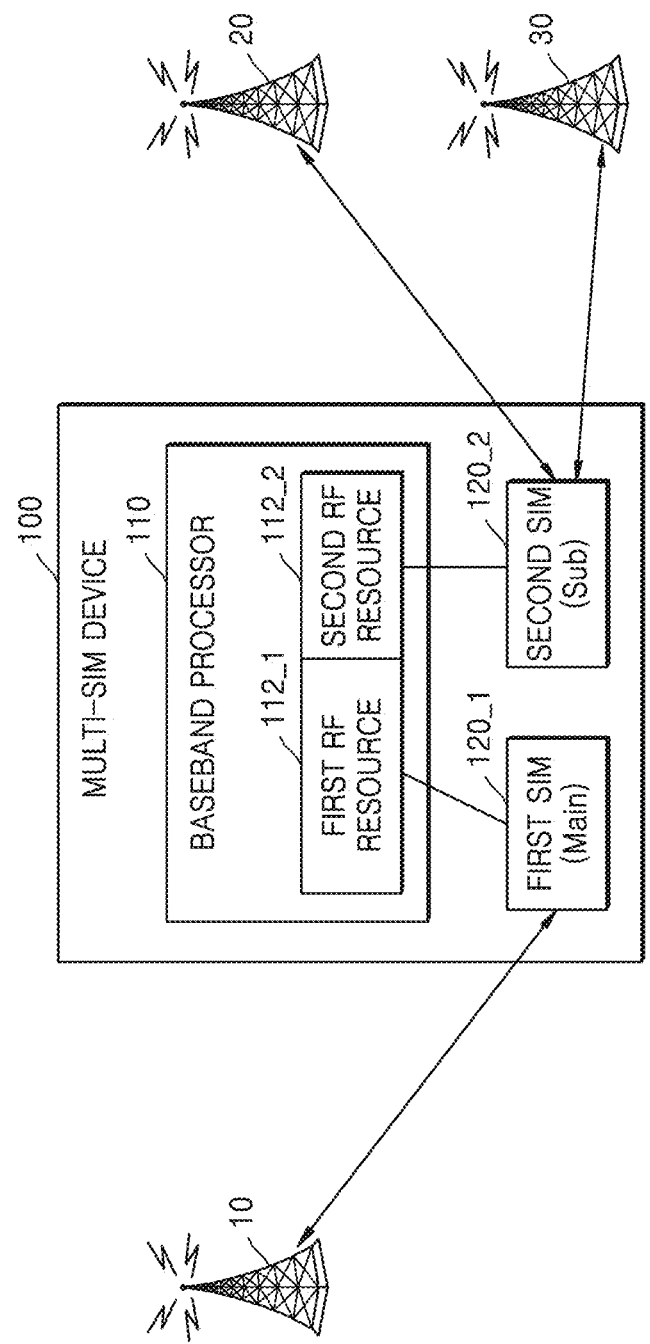
FIG. 9 is a diagram for explaining operations of a multi-SIM device, according to an embodiment.

FIG. 9 is a diagram for explaining operations of the multi-SIM device 100, according to an embodiment. Referring to FIG. 9, it is assumed that the multi-SIM device 100 operates in the DR mode, the first SIM 120_1 is set as the main SIM, the first RF resource 112_1 is assigned to the first SIM 120_1, the second SIM 120_2 is set as the sub-SIM, and the second RF resource 112_2 is assigned to the second SIM 120_2.

Referring to FIG. 9 the first SIM 120_1 may receive and process a periodic channel or a non-periodic channel from the first base station 10 by using the first RF resource 112_1, and the second SIM 120_2 may receive and process a periodic channel from the second base station 20 by using the second RF resource 112_2.

Since the first SIM 120_1 processes the periodic channel or the non-periodic channel by using the first RF resource 112_2 while the second SIM 120_2 is processing the periodic channel by using the second RF resource 112_2, the idle mode with the second base station 20 of the second network may be maintained, and in the idle mode, the second SIM 120_2 may perform reselection to change the second base station 20 to a third base station 30, handover operation, and the like.

Compared to the first RF resource 112_1, the second RF resource 112_2 according to an embodiment has advantages in terms of manufacturing costs and power consumption, and the communication performance of the multi-SIM device 100 may be secured at at least a threshold level by performing an operation of maintaining the connection between the second SIM 120_2 and the second network by using the second RF resource 112_2.

Figure 10:
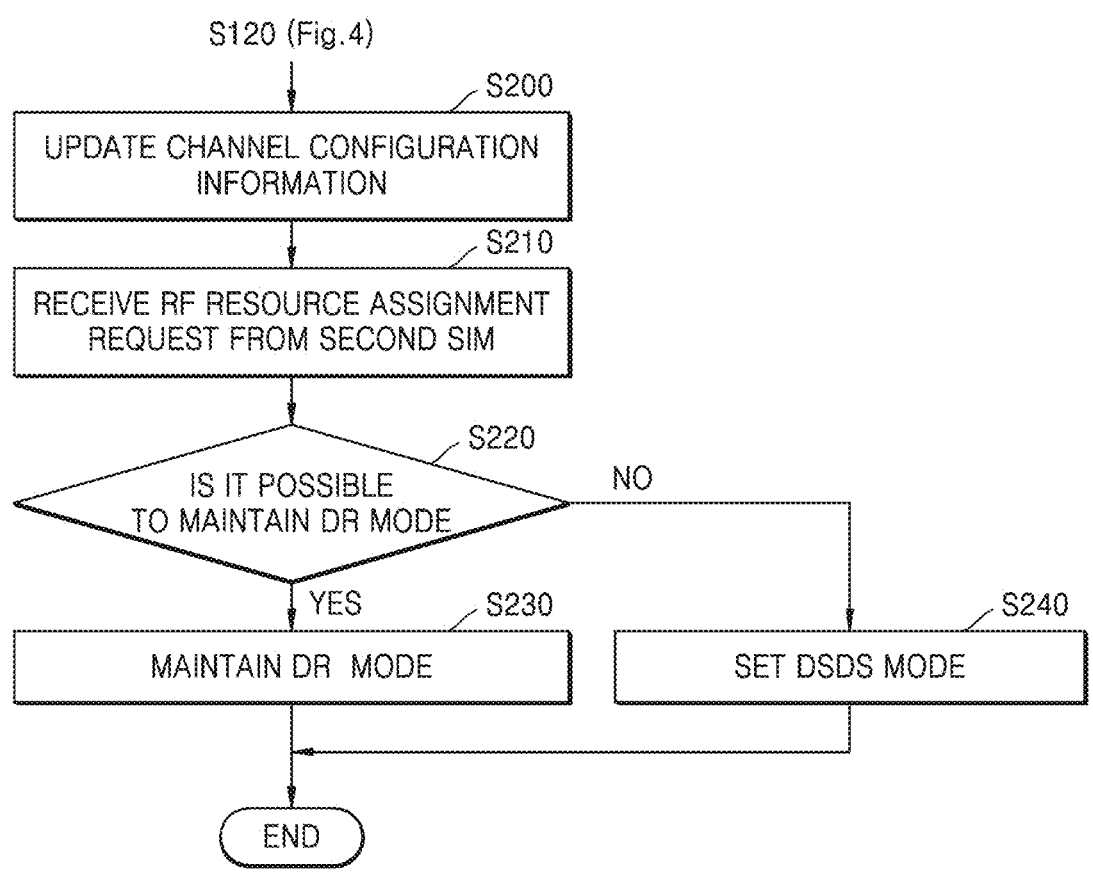
FIG. 10 is a flowchart for explaining an operation of maintaining a dual radio (DR) mode, according to an embodiment.
Figure 11:
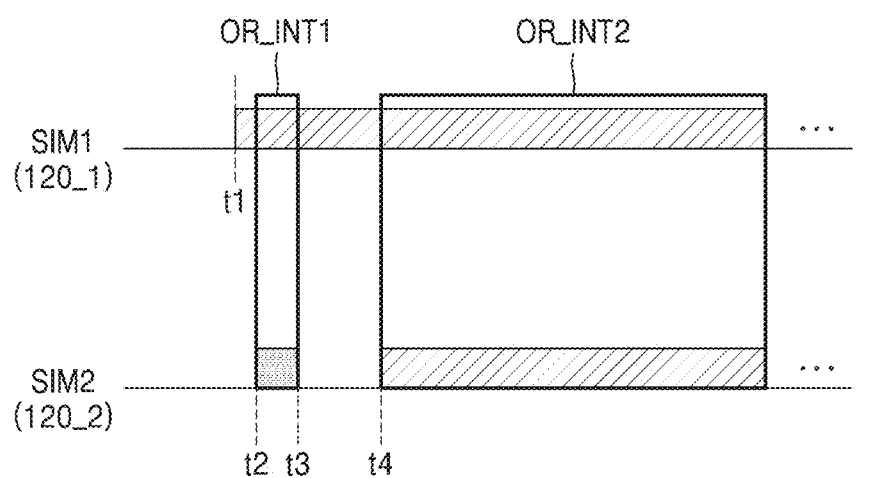
FIG. 11 is a diagram for explaining in detail operation S220 of FIG. 10.

FIG. 10 is a flowchart for explaining an operation of maintaining the DR mode, according to an embodiment. FIG. 11 is a flowchart for explaining operation S220 of FIG. 10 in detail. Hereinafter, the embodiments of FIGS. 10 and 11 will be described with reference to FIG. 2.

Referring to FIGS. 2 and 10, after operation S120 (FIG. 4), the baseband processor 110 may update the channel configuration information of the first SIM 120_1 and the channel configuration information of the second SIM 120_2 in operation S200. In operation S210, the baseband processor 110 may receive the RF resource assignment request from the second SIM 120_2. In operation S220, the DR/DSDS mode control module 114 may determine whether it is possible to maintain the DR mode based on the updated channel configuration information.

For example, referring further to FIG. 11, the multi-SIM device may operate in the DR mode, the first SIM 120_1 may be set as the main SIM, the first RF resource 112_1 may be assigned to the first SIM 120_1, the second SIM 120_2 may be set as the sub-SIM, and the second RF resource 112_2 may be assigned to the second SIM 120_2. The first SIM 120_1 may process the non-periodic channel Non_periodic_CH by using the first RF resource 112_1 from the first point in time t1. The second SIM 120_2 may process the periodic channel periodic_CH by using the second RF resource 112_2 from the second point in time t2 to the third point in time t3. At the fourth point in time t4, the second SIM 120_2 may receive the non-periodic channel Non_periodic_CH, and the channel configuration information regarding the second SIM 120_2 may be updated. The DR/DSDS mode control module 114 may determine whether it is possible to maintain the DR mode based on the updated channel configuration information. Referring to FIG. 11, after the fourth point in time t4, both the first SIM 120_1 and the second SIM 120_2 receive the non-periodic channels Non_periodic_CH, and thus, the multi-SIM device may not operate in the DR mode. In this case, the DR/DSDS mode control module 114 may determine that it is impossible for the multi-SIM device to maintain the DR mode and may control the multi-SIM device to be in the DSDS mode.

Referring back to FIG. 10, when it is possible to maintain the DR mode (operation S220, Yes), the DR/DSDS mode control module 114 may control the multi-SIM device to maintain the DR mode in operation S230. When it is impossible to maintain the DR mode (operation S220, No), the DR/DSDS mode control module 114 may control the multi-SIM device to be in the DSDS mode from the DR mode.

Figure 12:
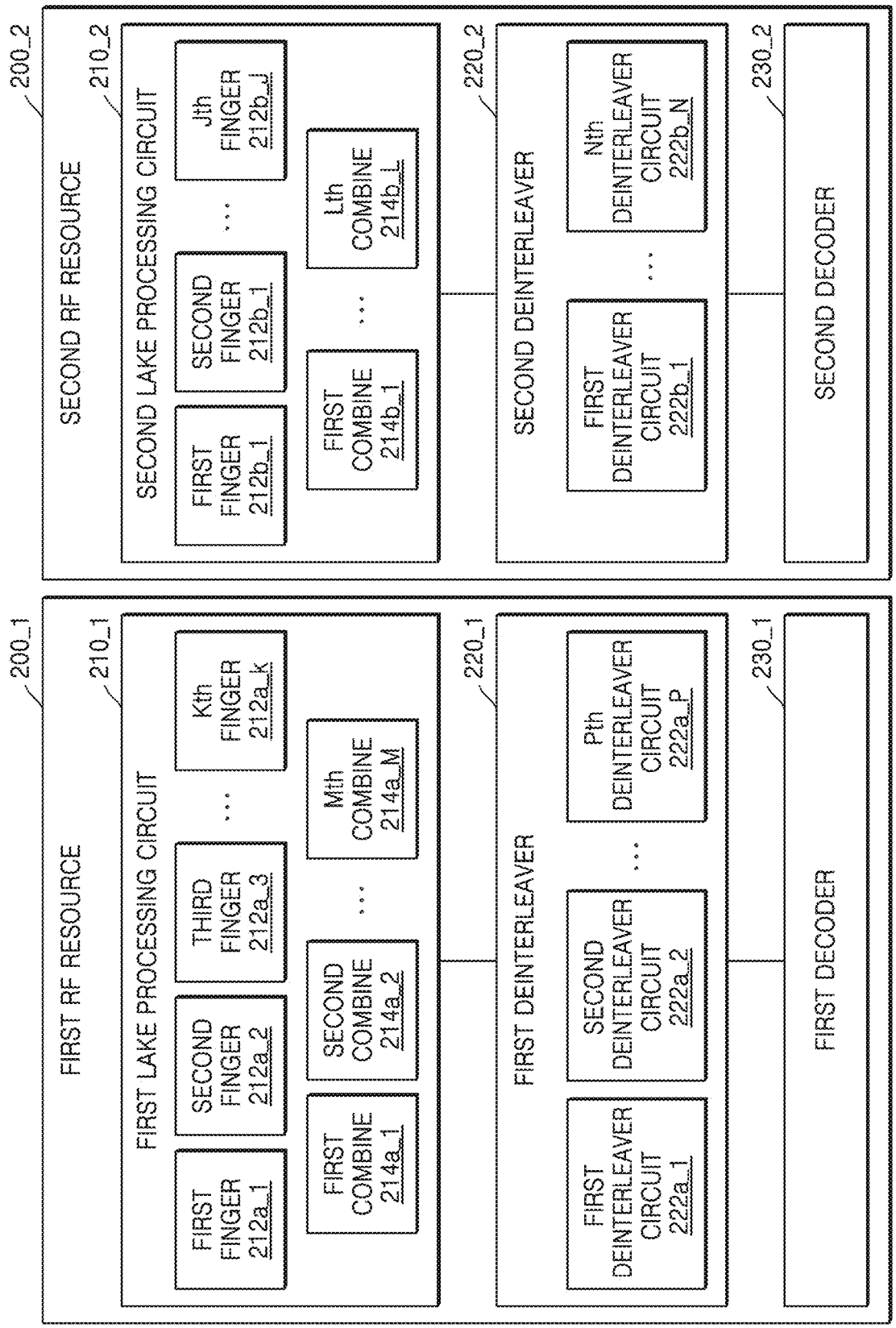
FIG. 12 is a block diagram for explaining in detail structures of a first RF resource and a second RF resource, according to an embodiment.

FIG. 12 is a block diagram for explaining in detail structures of a first RF resource 200_1 and a second RF resource 200_2, according to an embodiment. Hereinafter, the first RF resource 200_1 and the second RF resource 200_2 of FIG. 12 are applied to a WCDMA system, but this is merely an example. The first RF resource 200_1 and the second RF resource 200_2 are not limited thereto and may be realized to be applied to various communication systems.

Referring to FIG. 12, the first RF resource 200_1 may include a first lake processing circuit 210_1, a first deinterleaver 220_1, and a first decoder 230_1, and the second RF resource 200_2 may include a second lake processing circuit 210_2, a second deinterleaver 220_2, and a second decoder 230_2. In an embodiment, the structure of the first RF resource 200_1 may differ from that of the second RF resource 200_2, the first RF resource 200_1 may support the use of a non-limited channel configuration, and the second RF resource 200_2 may support the use of a limited channel configuration. Thus, the complexity of the structure of the first RF resource 200_1 may be greater than a complexity of the structure of the second RF resource 200_2.

The first lake processing circuit 210_1 may include first to $K^{th}$ fingers $212a\_1$ to $212a\_K$ and first to $M^{th}$ combines $214a\_1$ to $214a\_M$, and the first deinterleaver 220_1 may include first to $P^{th}$ deinterleaver circuits $222a\_1$ to $222a\_P$. The second lake processing circuit 210_2 may include first to $J^{th}$ fingers $212b\_1$ to $212b\_J$ and first to $L^{th}$ combines $214b\_1$ to $214b\_L$. The second deinterleaver 220_2 may include first to $N^{th}$ deinterleaver circuits $222b\_1$ to $222b\_N$.

The first lake processing circuit 210_1 of the first RF resource 200_1 may include a larger number of fingers and combines than the second lake processing circuit 210_2 so as to receive and process a larger number and a variety of channels than the second RF resource 200_2. The first deinterleaver 220_1 may include more deinterleaver circuits than the second deinterleaver 220_2. Also, the first decoder 230_1 may decode a great amount of data compared to the second decoder 230_2.

Figure 13:
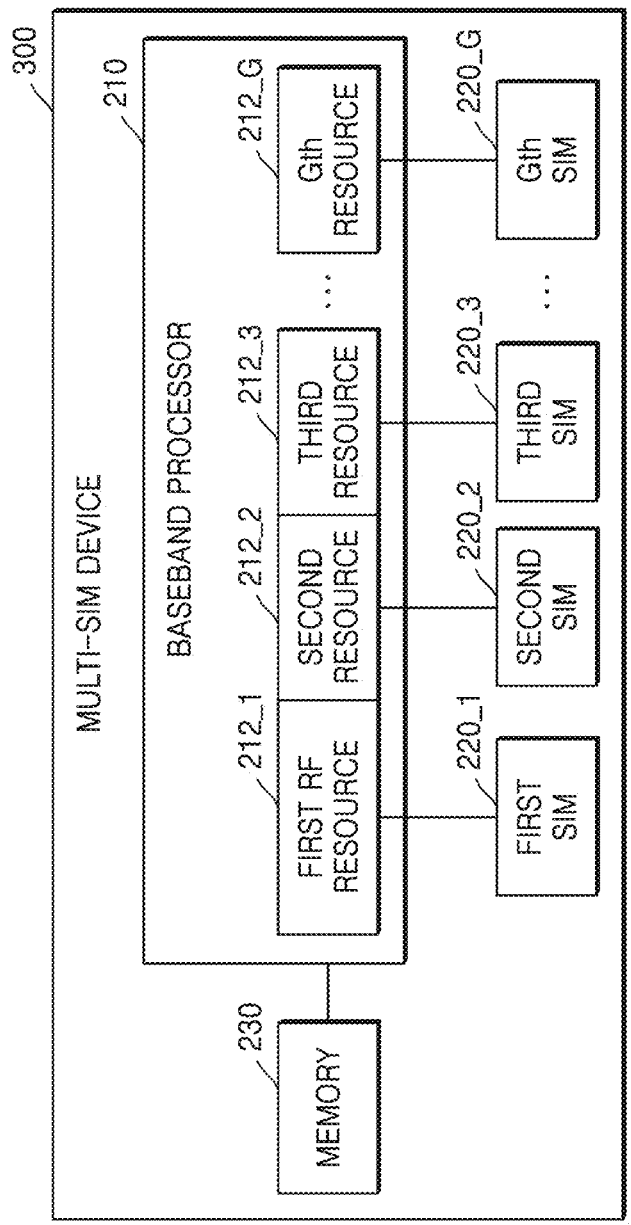
FIG. 13 is a block diagram of a multi-SIM device according to an embodiment.

FIG. 13 is a block diagram of a multi-SIM device 300 according to an embodiment.

Referring to FIG. 13, the multi-SIM device 300 may include a baseband processor 210, first to $G^{th}$ SIMs 220_1 to 220_G, and a memory 230. The baseband processor 210 may include first to $G^{th}$ RF resources 212_1 to 212_G. The first to $G^{th}$ RF resources 212_1 to 212_G are assigned to any one of the first to $G^{th}$ SIMs 220_1 to 220_G and may support the use of a non-limited channel configuration or a limited channel configuration according to RRC protocols. For example, the first RF resource 212_1 may support the use of the non-limited channel configuration, and the second to $G^{th}$ RF resources 212_2 to 212_G may support the use of the limited channel configuration.

When RF resource request intervals of at least two target SIMs among the first to $G^{th}$ SIMs 220_1 to 220_G overlap each other, the baseband processor 210 may assign some of the first to $G^{th}$ RF resources 212_1 to 212_G to the target SIMs of the first to $G^{th}$ SIMS 220_1 to 220_G based on information regarding networks respectively corresponding to the target SIMs and thus may simultaneously support the non-limited channel configuration and the limited channel configuration. In detail, the first RF resource 212_1 may be assigned to target SIMs, which handle non-periodic channels among the target SIMs, to support the use of the non-limited channel configuration, and the second RF resource 212_2 may be assigned to other target SIMs to support the use of the limited channel configuration.

In addition, as another embodiment, the first RF resource 212_1 may be assigned to a target SIM having a faster wake-up timing than other target SIMs in the idle mode to support the use of the non-limited channel configuration, and the second RF resource 212_2 may be assigned to other target SIMs to support the use of the limited channel configuration.

Figure 14:
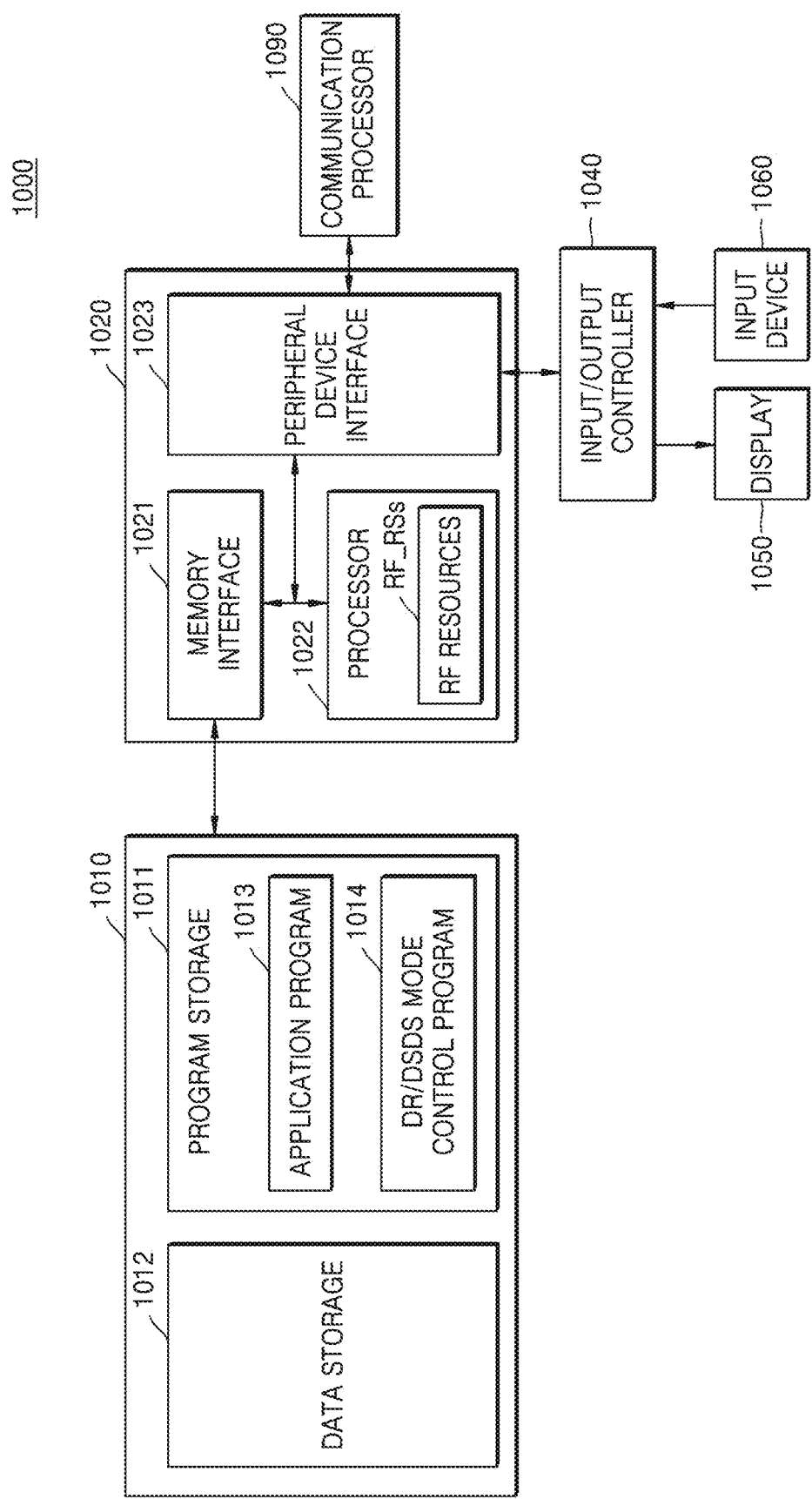
FIG. 14 is a block diagram of an electronic device according to an embodiment.

FIG. 14 is a block diagram of an electronic device 1000 according to an embodiment.

Referring to FIG. 14, the electronic device 1000 may include a memory 1010, a processor unit 1020, an input/output controller 1040, a display 1050, an input device 1060, and a communication processor 1090. Here, a plurality of memories 1010 may be included. Each component is described as follows.

The memory 1010 may include a program storage 1011 storing a program for controlling the operation of the electronic device 1000 and a data storage 1012 storing data generated while the program is executed. The data storage 1012 may store data to execute an application program 1013 and a DR/DSDS mode control program 1014. The program storage 1011 may include the application program 1013 and the DR/DSDS mode control program 1014. The programs included in the program storage 1011 may be expressed as an instruction set.

The application program 1013 includes application programs executed in the electronic device 1000. That is, the application program 1013 may include commands of an application executed by a processor 1022. The DR/DSDS mode control program 1014 may control the operation of determining the DR mode and the assignment of RF resources supporting the use of the non-limited/limited channel configuration. That is, the electronic device 1000 may assign the RF resources supporting the operation of determining the DR mode and the use of the non-limited/limited channel configuration through the DR/DSDS mode control program 1014.

A peripheral device interface 1023 may control the connection of the processor 1022 and the memory interface 1021 with input/output peripheral devices of a base station. The processor 1022 controls the electronic device 1000 to provide a service by using at least one software program. In this case, the processor 1022 may provide a service corresponding to the program by executing at least one program stored in the memory 1010. Also, the processor 1022 may include RF resources RF RSs supporting the use of the non-limited/limited channel configuration according to embodiments.

The input/output controller 1040 may provide an interface between the peripheral device interface 1023 and an input/output device such as the display 1050 and the input device 1060. The display 1050 displays state information, input texts, a moving picture, a still picture, or the like. For example, the display 1050 may display information regarding an application executed by the processor 1022.

The input device 1060 may provide the processor unit 1020 with input data generated due to the selection of the electronic device 1000, through the input/output controller 1040. In this case, the input device 1060 may include a keypad including at least one hardware button, a touch pad detecting touch information, and the like. For example, the input device 1060 may provide the processor 1022 with touch information such as a touch detected by the touch pad, a touch movement, and touch release, through the input/output controller 1040.

The electronic device 1000 may include the communication processor 1090 performing a communication function for voice/data communication, and in accordance with the assignment of the RF resources RF_RSs, the DR/DSDS mode control program 1014 may control the communication processor 1090 to receive a channel from the base station.

Figure 15:
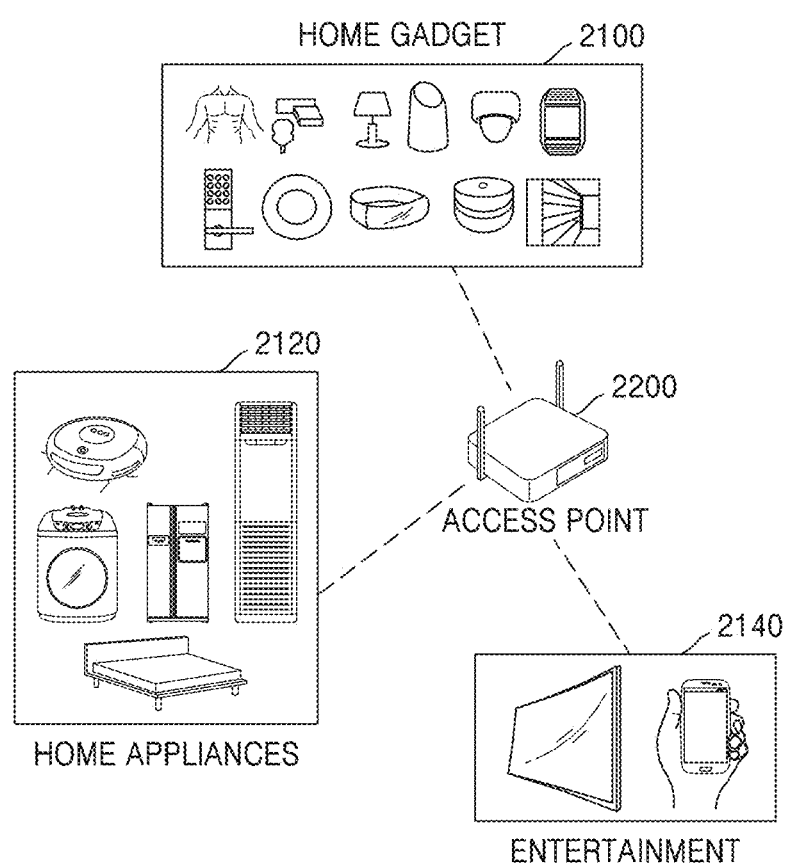
FIG. 15 is a diagram showing communication devices performing an operation of determining transmission/reception beam patterns, according to an embodiment.

FIG. 15 is a diagram showing communication devices performing operation of determining transmission/reception beam patterns.

Referring to FIG. 15, home gadgets 2100, home appliances 2120, entertainment devices 2140, and an access point (AP) 2200 may include the wireless communication device according to one or more embodiments and may set the DR mode or perform the assignment of RF resources. In some embodiments, the home gadgets 2100, the home appliances 2120, the entertainment devices 2140, and the AP 2200 may form an IoT network system. Communication devices shown in FIG. 15 are merely examples, and it will be understood that other communication devices that are not shown in FIG. 15 may include wireless communication devices according to one or more embodiments.

While the inventive concept has been particularly shown and described with reference to embodiments thereof, it will be understood that various changes in form and details may be made therein without departing from the spirit and scope of the following claims.

What is claimed is:

1. A multi-subscriber identification module (SIM) device comprising:
    a first SIM configured to use a first service of a first network;
    a second SIM configured to use a second service of a second network;
    a first radio frequency (RF) resource configured to support use of a non-limited channel configuration according to a radio resource control (RRC) protocol;

a second RF resource configured to support use of a limited channel configuration according to the RRC protocol; and a baseband processor configured to:

selectively assign the first RF resource and the second RF resource to the first SIM and the second SIM, based on information regarding the first network and the second network, select a mode among a dual radio (DR) mode and a dual sim dual standby (DSDS) mode based on the information when a first RF resource use request interval of the first SIM overlaps a second RF resource use request interval of the second SIM, and control the multi-SIM device to operate in the mode that is selected, wherein the baseband processor is further configured to, based on the DR mode being selected, set a main SIM and a sub-SIM by using the first SIM and the second SIM, assign the first RF resource to the main SIM, and assign the second RF resource to the sub-SIM.

2. The multi-SIM device of claim 1, wherein a first structure of the first RF resource is different from a second structure of the second RF resource.

3. The multi-SIM device of claim 1, wherein the first RF resource is further configured to support processing a first channel that a first assigned SIM of the first SIM and the second SIM, which is assigned to the first RF resource, handles in an idle mode and a second channel used to maintain a network connection mode, and the second RF resource is further configured to support processing a third channel that a second assigned SIM of the first SIM and the second SIM, which is assigned to the second RF resource, handles in the idle mode.

4. The multi-SIM device of claim 1, wherein the information comprises at least one of first channel configuration information regarding a first channel between the first network and the first SIM, first scheduling information regarding the first channel, second channel configuration information regarding a second channel between the second network and the second SIM, and second scheduling information regarding the second channel.

5. The multi-SIM device of claim 1, wherein the baseband processor is further configured to set the main SIM and the sub-SIM based on first periodic/non-periodic characteristics of a first channel between the first network and the first SIM and second periodic/non-periodic characteristics of a second channel between the second network and the second SIM.

6. The multi-SIM device of claim 1, wherein the baseband processor is further configured to set the main SIM and the sub-SIM based on first scheduling information of a first channel between the first network and the first SIM, and second scheduling information of a second channel between the second network and the second SIM.

7. The multi-SIM device of claim 1, wherein the main SIM is configured to perform a first operation with the first network by using the first RF resource, and the sub-SIM is configured to perform a second operation with the second network by using the second RF resource.

8. The multi-SIM device of claim 1, further comprising a memory configured to store first information regarding the first network that is obtained from the first SIM and second information regarding the second network that is obtained from the second SIM, the first information and the second information being accessible by the baseband processor.

9. A multi-subscriber identification module (SIM) device comprising:

a first SIM configured to use a first service of a first network;

a second SIM configured to use a second service of a second network;

a first radio frequency (RF) resource configured to support use of a non-limited channel configuration according to a radio resource control (RRC) protocol;

a second RF resource configured to support use of a limited channel configuration according to the RRC protocol; and a baseband processor configured to:

selectively assign the first RF resource and the second RF resource to the first SIM and the second SIM, based on information regarding the first network and the second network, select a mode among a dual radio (DR) mode and a dual sim dual standby (DSDS) mode based on the information when a first RF resource use request interval of the first SIM overlaps a second RF resource use request interval of the second SIM, and control the multi-SIM device to operate in the mode that is selected, wherein, based on the DSDS mode being selected, the baseband processor is further configured to assign the first RF resource to one of the first SIM and the second SIM.

10. A multi-subscriber identification module (SIM) device comprising:

a first SIM configured to use a first service of a first network;

a second SIM configured to use a second service of a second network;

a first radio frequency (RF) resource configured to support use of a non-limited channel configuration according to a radio resource control (RRC) protocol;

a second RF resource configured to support use of a limited channel configuration according to the RRC protocol; and a baseband processor configured to:

selectively assign the first RF resource and the second RF resource to the first SIM and the second SIM, based on information regarding the first network and the second network, select a mode among a dual radio (DR) mode and a dual sim dual standby (DSDS) mode based on the information when a first RF resource use request interval of the first SIM overlaps a second RF resource use request interval of the second SIM, and control the multi-SIM device to operate in the mode that is selected, wherein, based on the first RF resource use request interval not overlapping the second RF resource use request interval-, the baseband processor is further configured to control the multi-SIM device to operate in the DSDS mode.

* * * * *